US006944735B2

United States Patent
Noble

(10) Patent No.: US 6,944,735 B2
(45) Date of Patent: *Sep. 13, 2005

(54) METHOD AND APPARATUS FOR DISC DRIVE DATA SECURITY USING A DEFECT LIST

(75) Inventor: Gayle L. Noble, Boulder Creek, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/871,683

(22) Filed: Jun. 16, 2004

(65) Prior Publication Data

US 2004/0255079 A1 Dec. 16, 2004

Related U.S. Application Data

(63) Continuation of application No. 09/795,877, filed on Feb. 28, 2001, now Pat. No. 6,782,458.
(60) Provisional application No. 60/185,257, filed on Feb. 28, 2000.

(51) Int. Cl.$^7$ .......................... G06F 12/14; G06F 12/16
(52) U.S. Cl. .................. 711/163; 711/164; 711/202; 711/206; 714/6; 714/8

(58) Field of Search ................. 711/163, 164, 711/202, 206; 714/6, 8

(56) References Cited

U.S. PATENT DOCUMENTS

| 5,875,349 A | * | 2/1999 | Cornaby et al. ............... 710/5 |
| 5,930,825 A | * | 7/1999 | Nakashima et al. ......... 711/163 |
| 2004/0078648 A1 | * | 4/2004 | Sims et al. .................... 714/8 |

* cited by examiner

*Primary Examiner*—Matthew D. Anderson
*Assistant Examiner*—Hetul Patel
(74) *Attorney, Agent, or Firm*—Raghunath S. Minisandram; Jesus Del Castillo

(57) ABSTRACT

Method and apparatus for storing and retrieving copy-protected data within storage devices such as, for example, disc drives. Data that is to be copy protected is written on the storage device. A first data list, such as a manufacturer's storage device defect list, is copied and used to make a second data list. Then, the first data list is modified such that the area where the copy protected data is stored is identified as defective. Unless a request to read the copy protected data is received, the first data list is used and the copy protected data area is considered defective. However, if a request to read the copy protected data is received, the second data list is used and the copy protected data is read from its storage location.

7 Claims, 6 Drawing Sheets

METHOD AND APPARATUS FOR DISC DRIVE DATA SECURITY USING A DEFECT LIST

CROSS-REFERENCE TO A RELATED APPLICATION

This application is a continuation of U.S. Pat Ser. No. 09/795,877, filed Feb. 28, 2001 now U.S. Pat. No. 6,782,458 in the name of Gayle L. Noble.

This invention is based on U.S. Provisional Patent Application Ser. No. 60/185,257 filed Feb. 28, 2000, entitled Use Defect Lists To Hide Copy-Protected Data filed in the name of Gayle L. Noble. The priority of this provisional application is hereby claimed.

U.S. Patent application entitled "Method and Apparatus for Disc Drive Data Security Using A Servo Wedge", Ser. No. 09/796,197 filed on Feb. 28, 2001 filed in the name of Gayle L. Noble is hereby incorporated herein by reference in its entirety.

U.S. Patent application entitled "Method and Apparatus for Disc Drive Data Security Using Physical Location", Ser. No. 09/795,623 filed on Feb. 28, 2001 filed in the name of Gayle L. Noble is hereby incorporated herein by reference in its entirety.

BACKGROUND OF THE INVENTION

1. Field of the Invention

The present invention generally relates to storing and retrieving copy-protected data on a disc drive.

2. Background of the Related Art

With the advent of the recording and playing of digital data, the need to store copy-protected data on disc drives becomes increasingly a necessity. Digital data is rapidly becoming the standard format by which industries, such as the entertainment industry, record and play multimedia. Paid for programming available to the public such as movies, sound tracks, music recordings, and the like, are increasing in demand. With digital recording, the public has more options than ever to listen to and/or record digital audio and video with unparalleled recording and playback quality.

One exemplary storage system being used more frequently to store digital multi-media is a computer controlled disc-based storage drive, e.g., a disc drive. Disc drives are capable of storing large amounts of digital data in a relatively small area. Disc drives store information on one or more recording media. The recording media conventionally take the form of a circular storage disc, e.g., media, having a plurality of recording tracks. Conventional disc drives include a plurality of the storage discs, vertically aligned, and each with at least on magnetic head for reading or writing information to the media. Typically, the magnetic head is attached to a positioner arm assembly that uses servomotors, such as stepper motors, to align the magnetic head above the disc. The location of the magnetic head is typically determined by a disc controller that is given the position of a data area on the disc to read or write data. The precise location of the head is typically accomplished by incorporating a closed-loop electro-mechanical servo system with a dedicated servo region, or regions, used to provide continuous feedback to the system to maintain accurate positioning of the data heads.

Unfortunately, due to the high quality of the data and the fact that the data stored on digital storage systems, such as disc drives, is often unprotected and easily copied, the copying and selling of unauthorized copies of digitally recorded material is on the rise. Consider the case where a paid for program such as an audio file is downloaded via a network of computers such as the Internet, to a disc drive for play by a client who has paid for the file. Often, the file may be copied to another storage media or to another disc drive for use by another user unless copy protection is used. This often referred to as "pirating" a copy of the file. Additionally, the file may be repackaged and sold by others for profit without permission, often called "software piracy". In addition, the files may be shared by other users by playing from the owner's computer allowing the end user the benefit of the file without purchasing the file from the owner.

Conventional digital copy-protection schemes involve techniques such as registration, encryption, digital watermarking, 5C content, and the like. For example, software copy protection schemes often involve the use of copy-protection techniques that require issuing registration numbers with each package. When you install the software, you must enter the registration number. This technique does not prevent all unauthorized copying, but it limits it. In addition, users may not be able to obtain updates to a software product unless they own the original diskettes and documentation. Unfortunately, the user may forget, or may have difficulty in registering the software and may become frustrated if the software stops working and/or working properly.

For conventional multimedia, data stored on optical surfaces such as found on a digital versatile disc (DVD) is often copy protected. For example, the digital-video format includes a content scrambling system (CSS) to prevent users from copying discs. The DVD system may also use key based techniques such as the 5C technique that has software keys that expire after use. Unfortunately, this means that today's DVD players may not be able to play DVD-video discs without a software and/or hardware upgrade to decode the encrypted and/or keyed data even though the use may be authorized.

Another issue with conventional copy protection is that of making backups of the data. For example, a user may have a computer that they need to backup the data, conventional encryption techniques often require that a hardware and/or specific software key(s) be used before the data can be successfully copied. Unfortunately, the user may not have the correct hardware or software key to allow the transfer of the data and may become frustrated.

Furthermore, most conventional copy protection techniques such as CSS are defeated over time causing the digital-video and software industry to constantly upgrade the hardware, and/or software techniques to combat the unauthorized copying. The constant upgrading and development of protection techniques that are eventually exposed and defeated causes an increase in the cost of the product as well as possible incompatibility issues with existing systems.

Thus, what is needed is a method that allows the recording and playing of copy protected material to the user without the ability to copy the data or use the data in an unauthorized manner without affecting the compatibility of the storage device to operate with non-copy protected data.

SUMMARY OF THE INVENTION

The present invention generally provides a method and apparatus for storing and retrieving copy protected data within storage devices such as a disc drive. One aspect of the present invention provides a method for writing on a disc drive data to be copy protected including the steps of providing data to be copy protected, then copying a first data list to a second data list, writing the data to be copy protected to a disc drive media, and then modifying the status of the copy protected data within the first data list, such as a manufacture's defect list, as defective.

Another aspect of the invention provides a method for reading copy protected data from a disc drive includes determining if a request to read copy protected data has been issued, then if the request to read copy protected data has not been issued then reading at least one data location status from a first data list wherein the location status indicates the location of the data as defective, but if the request to read copy protected data has been issued then reading the data location from a second data list and reading the data.

One aspect of the present invention provides a disc drive system includes a signal-bearing media means for storing data, a code memory means coupled to a read/write controller means for controlling the reading and writing of data to the signal-bearing media, a means for reading and writing the data to the signal-bearing media and a processor means coupled to the code memory and the read/write controller. The processor includes a program which, when executed on the processor for a write sequence, is configured to perform the steps including copying a first data list to a second data list, writing the data to be copy protected to the signal-bearing media, and modifying the status of the copy protected data within the first data list as defective. When the program is executed on the processor, for a read sequence, is configured to perform the step of determining if a request to read copy-protected data has been issued. If the request to read copy protected data has not been issued then reading at least one data location status from the first data table wherein the location status indicates the location of the data as defective, if the request to read copy protected data has been issued then reading the data location from the second data table and reading the data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Other features and advantages of the invention will become apparent to a person of skill in this field who studies the following description of an embodiment given below in association with the following drawings.

DETAILED DESCRIPTION OF THE PREFERRED EMBODIMENT

Embodiments of the invention have particular advantages in electronic data storage systems. One exemplary electronic data storage system commonly used in the computer industry, well suited for supporting the digital data copy protection method described herein, is known as a disc drive. As will be described below, aspects of the preferred embodiment pertain to specific method steps implementable on computer disc-drive systems.

In one embodiment, the invention may be implemented as part of a computer program-product for use with computer disc-drive systems. The programs defining the functions of a preferred embodiment can be provided to the disc drive via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disc drive); or (iii) information conveyed to a computer by communications medium, such as through a computer or telephone network, including wireless communication. Such signal-bearing media, when carrying computer-readable instructions that direct the functions of the present invention, represent alternative embodiments of the present invention. It may also be noted that portions of the product program may be developed and implemented independently, but when combined together are embodiments of the present invention.

Figure 1:
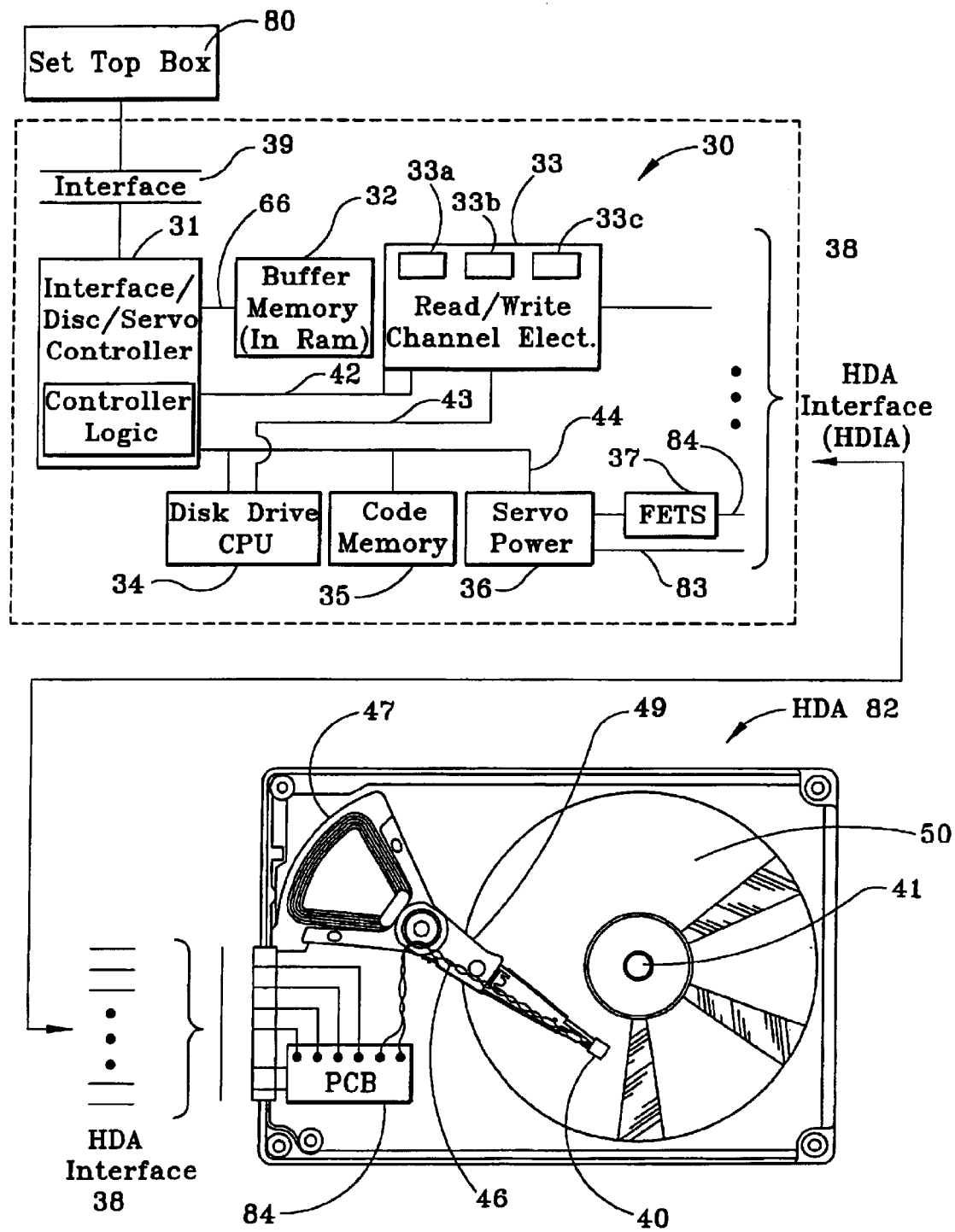
FIG. 1 is a plan view of a typical disc-based apparatus for reading and writing data on a media wherein the present invention may be used to advantage.

FIG. 1 is a plan view of a typical disc-based apparatus for reading and writing data on a media wherein the present invention may be used to advantage. FIG. 1 illustrates one embodiment of the invention including disc drive electronics 30 which in general includes an interface 39 adapted to receive external signals and data, and a Head Disc Assembly Interface (HDAI) 38 for connecting the disc drive electronics 30 to the head disc assembly (HD) 82. The HD 82 includes read/write transducer head(s) 40 coupled via wires 46 to the HDIA 38, a spindle motor 41, an actuator arm 49, a servo actuator 47, and other disc drive components that are well known in the art. The read/write transducer head(s) 40 are mounted on the actuator arm 49. As the servo actuator 47 moves the actuator arm 49, the read/write transducer head(s) 40 fly above a media 50 to read and write data to the media 50. The media 50 typically includes a disc or discs coated with a recording material such as ferrous iron, magneto-optical media, and other materials adapted to hold a magnetic charge. Media 50 may also include optical media such as a DVD adapted to optically store digital information. The set top box 80, coupled to interface 39, is used to communicate with video and audio sources such as digital cable TV systems, digital satellite, and the like and is adapted to handshake with the disc drive electronics 30 so as to control the inflow/outflow and protection of copy protected data. The step top box 80 is of any conventional design adapted to receive digital information and transmit the information to the interface, and communicate with the disc drive electronics 30 through interface 39 to interface/disc/servo controller 31. The set top box may communicate with the interface through any conventional communication mode such as SCSI, ATA, serial, IEEE 488, and any other form of electronic data transfer. Illustrative multimedia formats include audio files (e.g., AU, WAV, AIFF, MIDI, MP3), video files (e.g., MPEG, AVI), image files (GIF, JPEG, XBM, TIFF, PICT, Raster file) and other formats known in the art.

The interface/disc/servo controller 31 provides a translation and command interface between the set top box 80 and disc drive electronics 30 through the interface 39. The interface/disc/servo controller 31 is directly connected to the buffer memory 32 through a memory bus connection 66. The buffer memory 32 may store program code and/or data for use with the operation of the drive. Interface/disc/servo controller 31 is also connected via a read/write bus 44 to CPU 34 used for processing the disc drive commands, the code memory 35 is adapted to store operational data and commands, and the servo power electronics 36 are adapted to operate the servomotor 41 and actuator arm 49. Servo power electronics 36 are typically connected to the HD 82 via servo control connection 84 to a plurality of FET switches 37 that control the spin motor 41. The HDAI 38 provides an electrical connection between the printed circuit board assembly (PCBA) 84 including the internal disc drive electronics 30, and the HD 82 including the disc drive internal mechanical and electromechanical components. Read/write channel electronics 33 used to transmit data to and from the media 50 via data bus 42 include read write logic 33a, write logic 33b, and servo logic 33c, and includes a connection to the interface/disc/servo controller 31 through the data bus 42. A serial bus 43 is used to send configuration commands from the CPU 34 to the read/write channel electronics 33.

FIG. 1 is merely one hardware configuration for a disc-drive data storage system. A preferred embodiment of the present invention can apply to any comparable hardware configuration, regardless of whether the disc-drive data storage apparatus is a complicated, multi-media storage apparatus including a plurality of media types, or a single disc-drive data storage apparatus.

Figure 2:
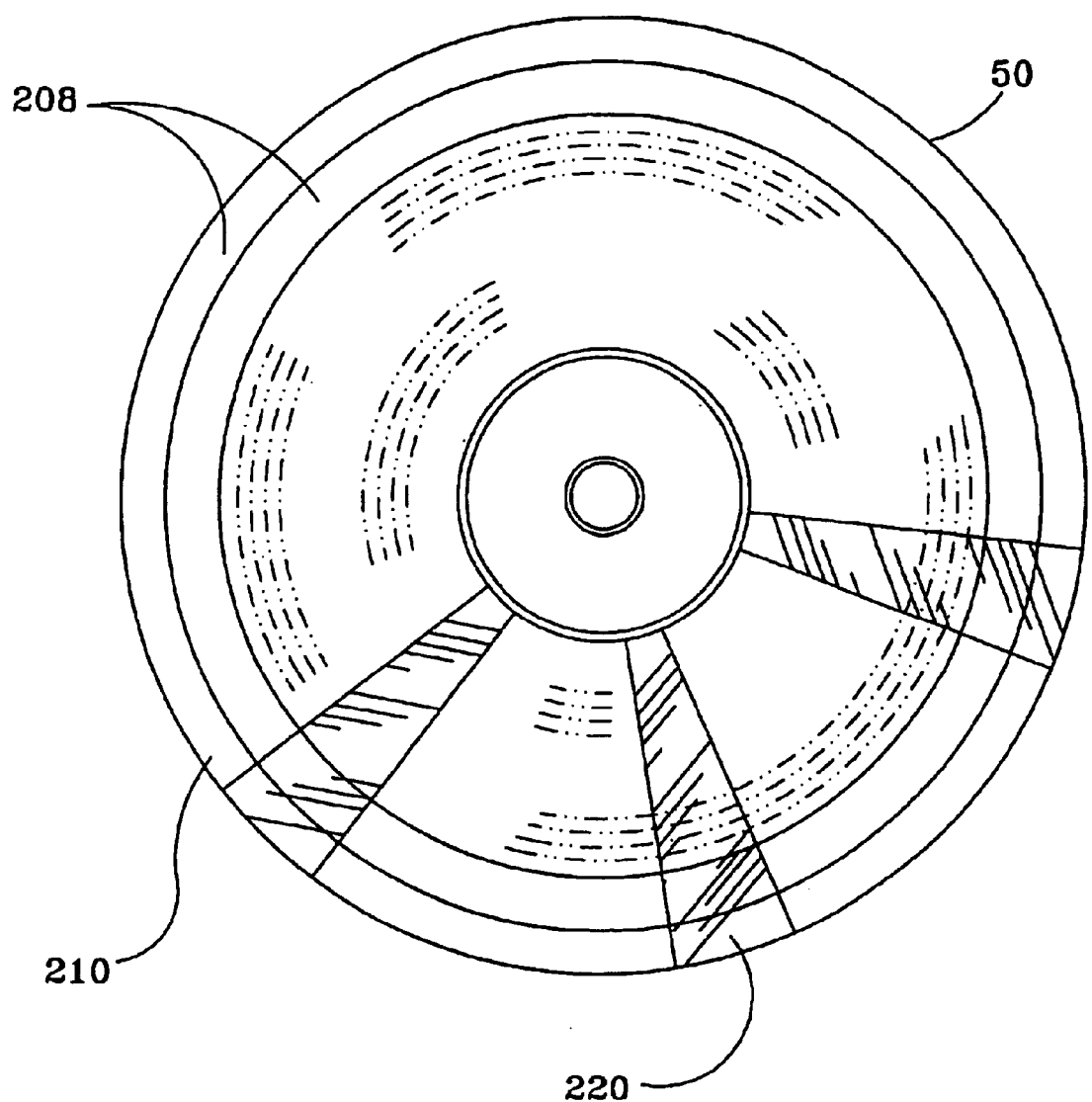
FIG. 2 is a plan view of typical media for storing data wherein the present invention may be used to advantage.

FIG. 2 is a plan view of the media 50 for storing data wherein the present invention may be used to advantage. FIG. 2 illustrates exemplary data storage tracks 208 on the media 50 including data wedges 210 separated by a plurality of servo wedges 220 in accordance to the present invention. As necessary, FIG. 1 is referenced in the following discussion of FIG. 2. For clarity, only portions of the tracks 208 are shown. Illustratively, a plurality of concentric tracks 208 are shown representing a plurality of data wedges 210 and servo wedges 220 extending across the media for data storage and retrieval by the read/write head(s) 40. As the read/write head(s) 40 fly over the media 50, the servo actuator 47 moves the actuator arm 49 to a particular track 208 on the media 50 in response from commands of the interface/disc/servo controller 31. The data wedges 210 are generally used for storing external data from an external user such as multimedia files and are generally accessible by the user through the interface 39. Servo wedges 220 are portions of each track 208 that may include read/write head(s) alignment indicia, physical address information, and check pointing data used for defect management. Servo wedge data is generally for the drive use and is generally inaccessible to the outside user.

Figure 3:
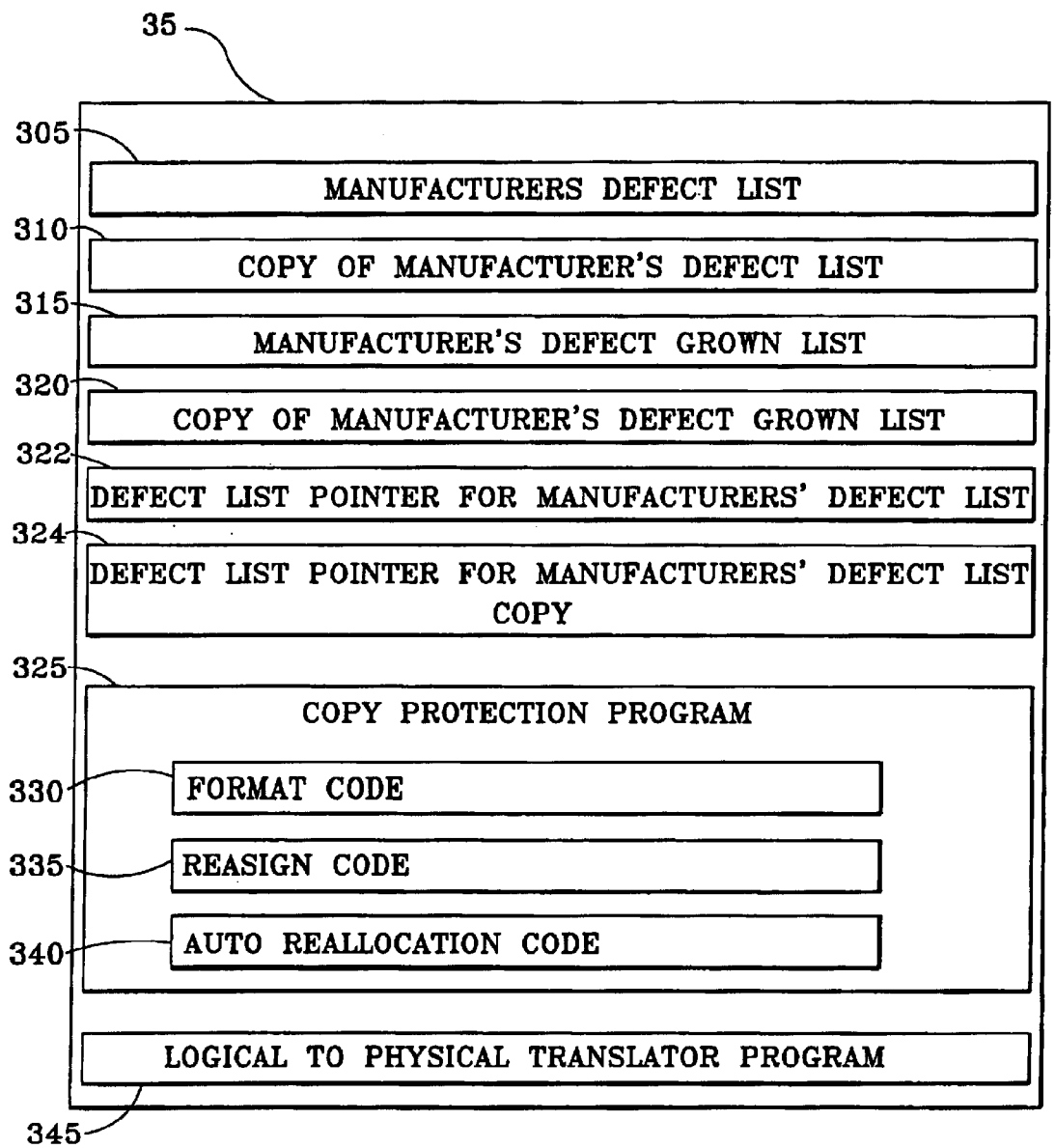
FIG. 3 illustrates a memory core for storing programming data in which the present invention may be used to advantage.

FIG. 3 illustrates the code memory 35 for storing programming data in which the present invention may be used to advantage. The code memory 35 is preferably random access memory sufficiently large to hold the necessary programming and data structures of the invention. The code memory 35 may be used to store operating code, and other run-time code that enables the drive. The contents of the code memory 35 may also be stored to a plurality of reserved areas of the media 50 or into other areas of the drive electronics 30 such as buffer memory 32 for redundancy.

The code memory 35 further includes a logical to physical translation program 345 adapted to transform logical block addresses (LBA) to physical media coordinates. Data communicated to and from a data storage system is normally managed by the LBA rather than by physical address. Data sectors are numbered blocks of data to be stored and retrieved. Data sectors are the fundamental units of data handled by the data storage system and are usually of fixed length, e.g., 512 bytes. In one aspect of the invention, one data sector equals the length of one data wedge 210. However, if the data wedges 210 are large, as is often the case with magnetic storage systems, several logical addressed data sectors may be stored in a single physical data wedge 210. The physical translation program 345 coordinates the translation of the logical address of a particular block of data to the physical address of the location at which the data is stored.

The coordination between logical addressing and physical addressing is complicated by defects in the recording material in which the data cannot be reliable stored and retrieved. Defects should therefore be skipped, that is, no attempt should be made to either write to or read from them. The details of one exemplar defect management method and apparatus is disclosed in U.S. patent application Ser. No. 09/241,795, entitled "Apparatus and Method for Efficient Defect Management In a Magneto-Optical data Storage System," Belser et al., filed on Feb. 1, 1999, which is hereby incorporated herein by reference in its entirety.

During manufacture, the recording media 50 is usually written to and then read back from to determine which physical addresses are defective. A manufacture's defect list 305, i.e., drive defect list, maps the relationship between logical and physical addresses between the non-defective physical addresses and logical addresses, is stored on the media 50 by the manufacture, and loaded into the code memory 35 during operation. Additionally, as the media 50 is used, other defects may occur through, for example, the read/write head(s) 40 inadvertently touching the surface of the media 50 during a read and/or write operation and physically damaging a data sector on the media 50. Media defects subsequent to the manufacturer's defect list 305 are placed in the manufacturer's defect grown list 315. Thus, the manufacturer's defect grown list literally "grows" as the media 50 is used. In one aspect of the invention, the code memory 35 further includes a copy of the manufacture's defect list 310, and an identical copy of the manufacture's grown list 320 for use with the copy protection program 325.

To use the manufacture's defect list 305, a defect list pointer 322 is called during the reading of the manufacturer's defect list 305. Additionally, a grown defect list pointer 324 is also used to point the operating code to the manufacturing defect grown list 315. The drive then has the information necessary to skip bad data areas and record data to reliable data sectors. In one aspect, during operation, both the original and copy of the defect grown lists are kept identically the same. When the disc drive is powered down, the manufactures defect grown list 315 and an identical copy of the manufactures defect grown list 320 are stored to reserved area(s) on the media 50, and/or to non-volatile memory, for the next power up sequence.

The code memory 35 further includes the copy protection program 325 used to allow the reading and writing of copy-protected data. The copy protection program 325 generally includes format code 330 to allow the disc drive electronics 30 to format the drive data sectors, reassign code 335 to allow the data to be reassigned to other data sectors, and auto reallocation code 340 used to automatically reallocate data on the media 50 when the drive is reallocating data during a reallocation process for example when defects are found or when the media 50 is being optimized for space. While code memory 35 is shown as a single entity, it should be understood that code memory 35 may in fact may be volatile or non-volatile, comprise a plurality of modules, and that the code memory 35 may exist at multiple levels, from high speed registers and caches to lower speed but larger DRAM chips.

Figure 4:
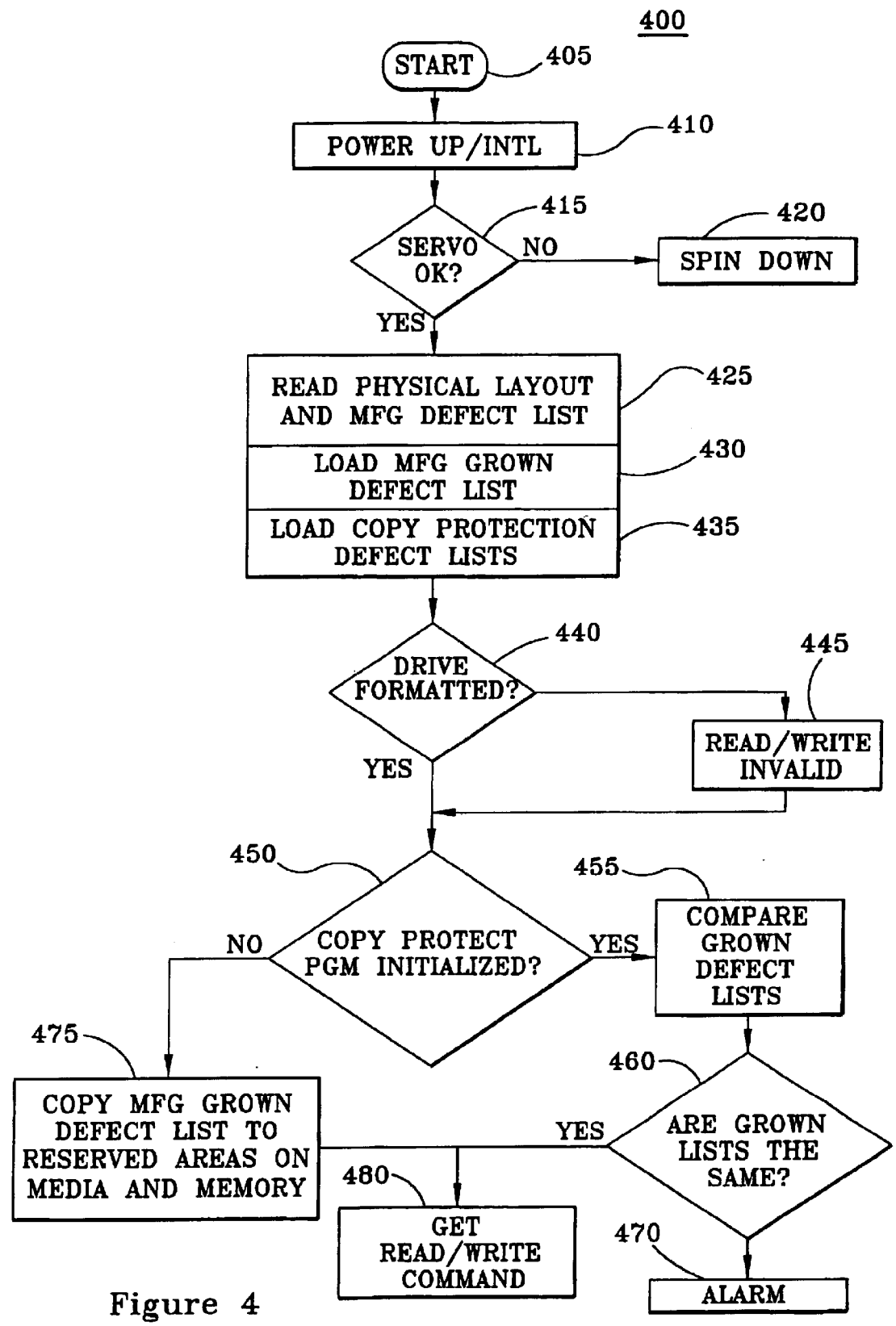
FIG. 4 is a flow diagram of a method for a start-up sequence for the disc-based apparatus of FIG. 1 in accordance with the present invention.

FIG. 4 is a flow diagram of a method 400 for a start-up sequence for the disc-based apparatus of FIG. 1 in accordance with the present invention. As necessary, FIGS. 1–3 are referenced in the following discussion of FIG. 4.

FIG. 4 is entered at step 405 when for example the set top box 80 instructs the disc drive electronics 30 to read or write data to media 50. At step 410, the interface/disc/servo controller 31 initializes the disc drive electronics 30, CPU 32, the code memory 35, the servo power 36, FETs 37, the read/write channels 33, and the buffer memory 32 and begins the process of "spinning", i.e., rotating, the media 50 up to prepare the media 50 for a read/write operation. At step 415, method 400 determines whether the servomotor 41 is functioning properly. If the servomotor 41 is working improperly, the method 400 proceeds to step 420 and spins the servomotor 41 down. If the servomotor 41 is functioning properly, the method 400 proceeds to step 425. At step 425, the actuator arm 46 positions the read/write transducer head(s) 40 to read the physical layout data and the manufacturing defect list 305 storing them within a reserved area such as a reserved servo wedge 220 and/or memory. At step 430, the manufacturer's grown defect list 315 is read from a reserved area on the media 50 and/or non-volatile memory and loaded into the code memory 35 into a separate location. At step 435, the copy of the manufacturer's defect list 310 and the copy of manufacturer's defect grown list 320 are loaded into code memory 35. However, if the copy protection program 325 had never been called, as may be the case with a first turn on of the drive "original" spin up, there would not be a copy of a manufacture's defect list 310 to load. If this were the case, the method 400 would copy the manufacture's defect list 305 into the copy of the manufacture's defect list 310 data area of code memory 35.

At step 440, method 400 determines if the media 50 is properly formatted to receive data from the read/write transducer head(s) 40. If the media 50 is not properly formatted, then method 400 proceeds to step 445 to set the read/write commands as invalid and then proceeds to step 450. If the media 50 is properly formatted, then method 400 proceeds to step 450. At step 450, the method 400 determines whether the copy protection program 325 has been previously initialized, e.g., the copy protection program 325 was called from the set top box 80 or used previously. If the copy protection program 325 has not been previously initialized, i.e., used or called, then method 400 proceeds to step 475 and copies the manufactures grown list 315 to a reserved area on the media and/or memory, i.e., code memory 35 and/or buffer memory 32, and maintains the copy identically to the manufacturer's defect grown list 315 during drive operation for the next power up sequence. In one aspect, the lack of a copy of the manufacture's defect list 310 found at step 435 may indicate that the copy protection program 325 has not been previously initialized. Subsequently, the method 400 proceeds to step 480. If the copy protection program 325 has been previously initialized; i.e., called, then method 400 proceeds to step 475. At step 475, the original manufacturing defect grown list 315 is compared to the copy of the manufacture's defect grown list 320. Generally, the manufacturer's defect list 305 is not altered under normal operating conditions, whereas the manufacture's defect grown list 320 may change during the operation of the drive as new defects are found. However, the manufacture's defect grown list 320 may be altered using a command through interface 39. For example, an interface command through interface 39 could tell the drive to "throw away" the manufacture's defect grown list 320. Therefore, if the original manufacturing defect grown list 315 is different from the copy of the manufacturing defect grown list 320, indicating a possibility of drive tampering, an alarm flag is set. If the manufacture's defect grown list 320 was altered normally while in use, the manufacture's defect grown list 315 and the copy of the manufacture's defect grown list 320 are saved to a reserved area on the media 50 when the disc drive is powered down and would be identical. Thus, when then the manufacture's defect grown list 315 and copy of the manufacture's defect grown list 320 are loaded into code memory 35 from the media and or non-volatile memory at step 430 and 435, respectively, they should register as identical upon the next power on sequence of method 400. In one aspect, the alarm is transmitted to the set top box 80 that disables the transmission of the copy-protected data. If the original manufacturing defect grown list 315 is identical to the copy of the manufacturing defect grown list 320 then method 400 proceeds to step 480. At step 480, method 400 receives a read or a write command. If the read/write commands at step 480 where set to invalid from step 445, then the drive would be unable to be used for storing or retrieving data from the data wedges 210. If the read/write commands are set to valid, the method 400 waits for a read or write command.

Figure 5:
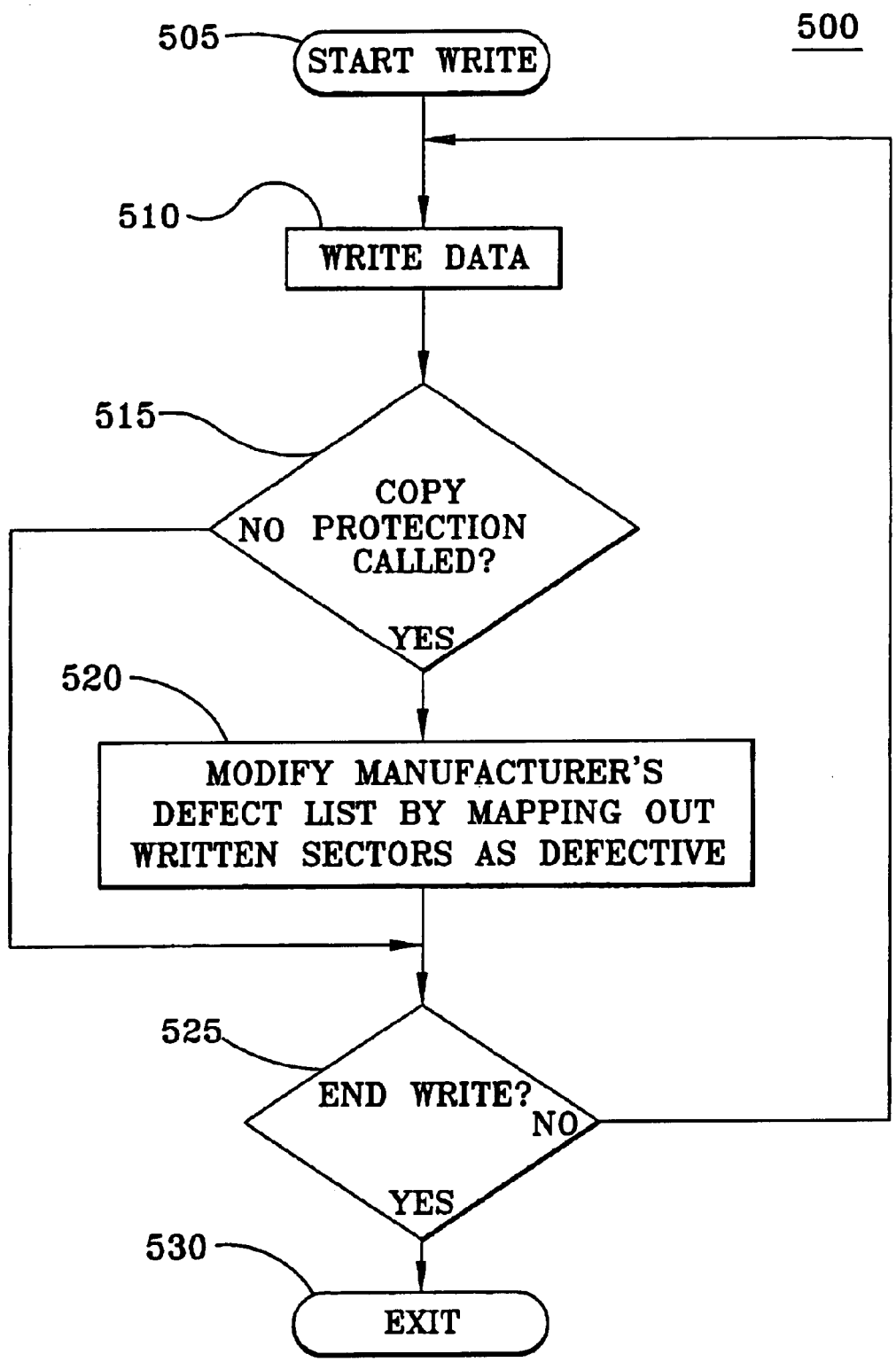
FIG. 5 is a flow diagram of a method for a write sequence for the disc-based apparatus of FIG. 1 in accordance with the present invention.

FIG. 5 a flow diagram of a method 500 for a method of writing data on the media 50 of FIGS. 1 and 2 in accordance with the present invention. As necessary, FIGS. 1–4 are referenced in the following discussion of FIG. 5.

FIG. 5 is entered at step 505 when a read or write command is received at step 480. At step 510, the read/write head(s) 40 are positioned by actuator arm 49 in response to interface/disc/servo controller 31 and data is written onto the media 50. At step 510, the method 500 uses the reassign code 335 and auto reallocation code 340 to determine which sectors are valid and available to be written to, converts the logical addresses to physical address using the logical to physical address translation program 345 and writes the data to the appropriate sectors on the media 50. At step 515, method 500 determines whether a copy protection command via interface 39 called the copy protection program 325. In one aspect, the set top box 80 issues the copy protection command to the interface/disc/servo controller 31. If the command for copy protection was not received and/or not understood, the method 500 proceeds to step 525. If the command for copy protection was received, the method 500 proceeds to step 520. At step 520, the method 500 modifies the manufacturer's defect list 305 by mapping the data sectors written to, from step 510, within the data wedges 210 as defective. In one embodiment, only segments of the data sectors are written as defective to increase the processing time and minimize the defect list length. Subsequently, method 500 proceeds to step 525. At step 525, method 500 determines if the write sequence has ended. If the sequence has ended, method 500 exits. If the write sequence has ended, then method 500 returns to step 510 and continues the write sequence. Thus, if the data copy protection was not called, the data may be normally written, and if the data protection was called, the data sectors written to are flagged as defective on the manufacturer's defect list 305. However, if defects are found during the written process with or without the copy protection program 325 called, both the manufacturer's defect grown list 315 and copy of manufacturer's defect grown list 320 are updated to reflect the defects. Thus, the grown lists 315 and 320 are kept identical until the next power up sequence (i.e., method 400) when they are compared.

Figure 6:
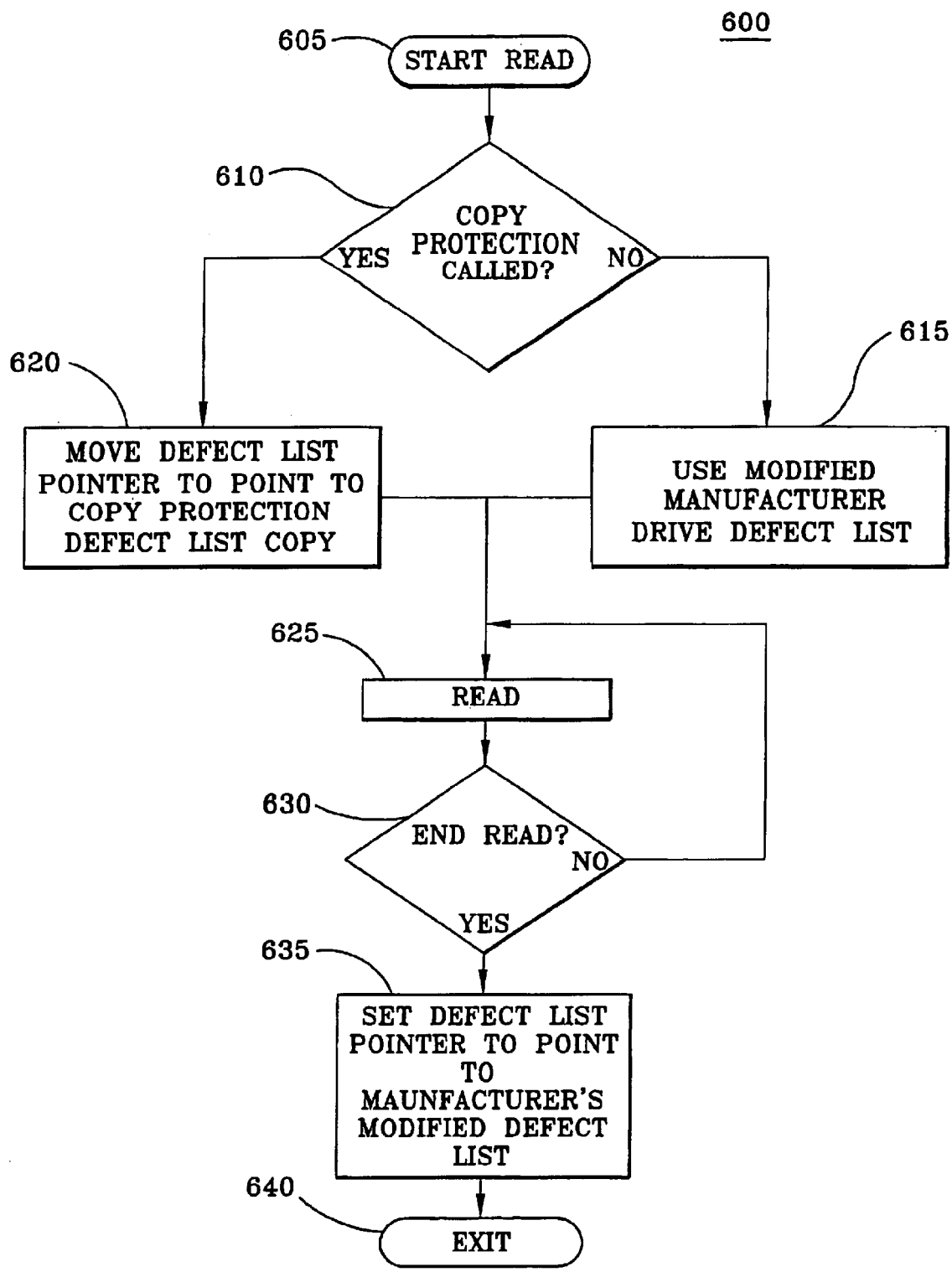
FIG. 6 is a flow diagram of a method for a read sequence for the disc-based apparatus of FIG. 1 in accordance with the present invention.

FIG. 6 a flow diagram of a method 600 for a method of reading data from the media 50 of FIG. 1 in accordance with the present invention. As necessary, FIGS. 1–5 are referenced in the following discussion of FIG. 6.

FIG. 6 is entered at step 605 when a read command is received at step 480. At step 610, method 600 determines if the copy protection program 325 was called. If the copy protection program 325 was not called then method 600 proceeds to step 615 and uses the manufacturer's defect list 305 by setting the defect list pointer 322 to point to the manufacture's defect list 305 that has been modified from step 520. Method 600 proceeds to step 625 described below to read the data. If the copy protection program 325 was called, then the method 600 proceeds to step 620. At step 620, method 600 sets the defect list pointer 322 to point to the copy of the manufacture's defect list 310 to read the data. At step 625, method 600 converts the logical addresses to physical address using the logical to physical address translation program 345 and then reads the data. If the data being read was written as copy protected from method 500 and the copy protection program 325 was called, then the data reads normally as the copy of the manufacturer's defect list 310 indicates the copy protected data sectors as normal data. From step 620, if the data being read was written as copy protected from method 500, and the copy protection program 325 was not called, then the data reads defective as the manufacture's defect list 305 indicates that the data sector locations of the copy protected material as defective. At step 630, method 600 determines if the read sequence has ended. If the read sequence has ended, the method 600 proceeds to step 635 described below. If the read sequence has not ended, the method 600 proceeds to step 625 and continues to read the data. At step 635 the defect list pointer 322 is set to point to the manufacture's defect list 305 and exits at step 340. Thus, an unauthorized user would not be able to read the data from the disc drive as the copy protected data is flagged as defective.

In summary, the present invention generally provides a method and apparatus for storing and retrieving copy protected data within storage devices such as a disc drive. One embodiment of the present invention provides a method 500 for writing on a disc drive data to be copy protected including the steps of providing data to be copy protected, then copying a first data list to a second data list, e.g., a manufacturer's defect list 305, writing the data to be copy protected to a disc drive media 50, and then modifying the status of the copy protected data within the first data list as defective. In one aspect, the first and second lists include a defect list, such as a manufacture's defect list 305. In another aspect, the first list comprises a manufacture's defect list and the second list includes a copy of the manufacture's defect list where the manufacture's defect list may include the manufacture's defect list 305. In one aspect, before the step 510 of providing data to be written, a step is included that provides a copy protection command signal. The step of providing a copy protection command signal may be a user selectable step. In another aspect, modifying the status of the copy protected data within the first data list as defective includes the step 520 of marking at least one of the written sector locations as defective. In one aspect, the means for reading and writing the data to the signal-bearing media 50 includes at least one read/write head 40 adapted to read and write data to the media 50.

Another embodiment of the invention provides a method 600 for reading copy protected data from a disc drive includes determining if a request 610 to read copy protected data has been issued, then if the request to read copy protected data has not been issued then reading 625 at least one data location status from a first data list, e.g., manufacturer's defect list 305 wherein the location status indicates the location of the data as defective, but if the request to read copy protected data has been issued then reading the data location from a second data list, e.g., a copy of the manufacturer's defect list 310 and reading the data 625. In one aspect, the location status indicates the location of the data as a bad sector. In another aspect, the data location status indicates missing data at the location of the data. In one aspect, the first and second list includes a defect list wherein the first list includes a drives defect list, i.e., manufacturer's defect list 305. The second list may include a copy of a drive defect list e.g., a copy of the manufacturer's defect list 310.

One embodiment of the present invention provides a disc drive system includes a signal-bearing media 50 means for storing data, a code memory 35 means coupled to a read/write controller 31 means for controlling the reading and writing of data to the signal-bearing media 50, a means for reading and writing the data to the signal-bearing media and a processor 34 means coupled to the code memory 35 and the read/write controller 31. The processor 34 includes a program 500 which, when executed on the processor 34 for a write sequence, is configured to perform the steps including copying 435 a first data list to a second data list, writing the data 510 to be copy protected to the signal-bearing media 50, and modifying 520 the status of the copy protected data within the first data list, e.g., manufacturer's defect list, 305 as defective. When the program is executed on the processor, for a read sequence, is configured to perform the step 610 of determining if a request to read copy-protected data has been issued. If the request to read copy protected data has not been issued then reading 625 at least one data location status from the first data table wherein the location status indicates the location of the data as defective, if the request to read copy protected data has been issued then reading 625 the data location from the second data table, e.g., copy of manufacturer's defect list 310, and reading the data. In one aspect, the signal-bearing media 50 is selected from the group including a semiconductor substrate, an optical substrate, a magneto-optical substrate, and combinations thereof. In another aspect, the step 520 of modifying the status of the copy protected data within the first data list as defective includes the step 520 of marking at least one data sector location as defective. In one aspect, the code memory 35 means is selected from the group of volatile memory, non-volatile memory, media, and combinations thereof. Additionally, the means for reading and writing the data to the signal-bearing media 50 may include at least one read/write head 40 adapted to read and write data to the media 50. In one aspect, the first and second list includes a defect list, e.g., manufacturer's defect list 305. Additionally, the first list may include a drive defect list, e.g., manufacturer's defect list 305. In one aspect, the second list may include a copy of a drive defect list, e.g., a copy of manufacturer's defect list 310.

Although various embodiments which incorporate the teachings of the present invention have been shown and described in detail herein, those skilled in the art can readily devise many other varied embodiments within the scope of the present invention. For example, it is contemplated that the copy protection program 325 may be integral to the overall drive code, or may be an impendent module within code memory 35. Alternatively, the copy protection program 325 may be partially stored external to the drive and downloaded through the interface 39.

While foregoing is directed to the preferred embodiment of the present invention, other and further embodiments of the invention may be devised without departing from the basic scope thereof, and the scope thereof is determined by the claims that follow.

I claim:

1. A method for writing data on a disc drive, comprising:
   determining if a request has been made to write copy protected data or unprotected data;
   providing data to be written;
   copying a first data list to a second data list if a request was made to write copy protected data, wherein said second data list is an exact copy of said first data list;
   writing the provided data to a disc drive media; and
   modifying the status of the written data within the first data list as defective if a request was made to write copy protected data.

2. The method of claim 1, wherein the first and second list comprise a defect list.

3. The method of claim 1, wherein the first list comprises a manufacture's defect list.

4. The method of claim 1, wherein the second list comprises a copy of the manufacture's defect list.

5. The method of claim 1, wherein prior to the step of providing data to be written, a step comprising, providing a copy protection command signal.

6. The method of claim 1, wherein modifying the status comprises the step of marking at least one of the written sector locations as defective.

7. The method of claim 6, wherein the sectors are defined by a logical block address.

* * * * *